(12) United States Patent
Byars et al.

(10) Patent No.: US 7,397,019 B1
(45) Date of Patent: Jul. 8, 2008

(54) LIGHT SENSOR MODULE, FOCUSED LIGHT SENSOR ARRAY, AND AN AIR VEHICLE SO EQUIPPED

(75) Inventors: James E. Byars, Palm Harbor, FL (US); Stephen Joseph Kissel, Valrico, FL (US); John J. Ringdahl, Tampa, FL (US)

(73) Assignee: Alliant Techsystems, Inc., Edina, MN (US)

( * ) Notice: Subject to any disclaimer, the term of this patent is extended or adjusted under 35 U.S.C. 154(b) by 0 days.

(21) Appl. No.: 11/163,446

(22) Filed: Oct. 19, 2005

(51) Int. Cl.
G01C 21/02 (2006.01)
G01C 3/08 (2006.01)
(52) U.S. Cl. .................. 250/206.1; 356/5.01; 356/5.04
(58) Field of Classification Search ... 250/206.1–206.3; 356/5.01–5.08
See application file for complete search history.

(56) References Cited

U.S. PATENT DOCUMENTS

| | | | |
|---|---|---|---|
| 5,239,352 A * | 8/1993 | Bissonnette | 356/5.01 |
| 5,973,649 A | 10/1999 | Andressen | |
| 6,060,703 A | 5/2000 | Andressen | |
| 6,522,396 B1 * | 2/2003 | Halmos | 356/5.01 |
| 2001/0030277 A1 * | 10/2001 | Rhoads | 250/208.1 |
| 2003/0043058 A1 * | 3/2003 | Jamieson et al. | 340/961 |
| 2005/0068517 A1 * | 3/2005 | Evans et al. | 356/5.01 |
| 2006/0060761 A1 * | 3/2006 | Williams | 250/221 |
| 2006/0132635 A1 * | 6/2006 | Land | 348/311 |

* cited by examiner

*Primary Examiner*—Georgia Epps
*Assistant Examiner*—Brian J Livedalen
(74) *Attorney, Agent, or Firm*—TraskBritt

(57) ABSTRACT

A light-sensing module and arrays of two or more light-sensing modules are described. Each light-sensing module comprises a mounting support structure that may include an air vehicle guidance section and an optical element adapted to direct incident light to a detector array that comprises an array of photodiodes and is attached to the mounting support structure. The detector array is adapted to receive the directed light and convert the received light to a set of electrical pulses via a plurality of photodetectors each of which is operatively coupled to an amplifier and a threshold circuit adapted to output a detection to a memory store adapted to associate a detection with a time-of-arrival. The light-sensing module may be adapted to output the associated detection and time-of-arrival. Air vehicles including the light-sensing modules are also disclosed.

18 Claims, 15 Drawing Sheets

| Pixel 1,1 | Pixel 1,2 | Pixel 1,3 | Pixel 1,4 | Pixel 1,5 |
|---|---|---|---|---|
| Pixel 2,1 | Pixel 2,2 | Pixel 2,3 | Pixel 2,4 | Pixel 2,5 |
| Pixel 4,1 | Pixel 4,2 | Pixel 4,3 | Pixel 4,4 | Pixel 4,5 |
| Pixel 5,1 | Pixel 5,2 | Pixel 5,3 | Pixel 5,4 | Pixel 5,5 |

FIG. 6A

| Pixel 1,1 | Pixel 1,2 | Pixel 1,3 | Pixel 1,4 | Pixel 1,5 |
|---|---|---|---|---|
| Pixel 2,1 | Pixel 2,2 | Pixel 2,3 | Pixel 2,4 | Pixel 2,5 |
| Pixel 4,1 | Pixel 4,2 | Pixel 4,3 | Pixel 4,4 | Pixel 4,5 |
| Pixel 5,1 | Pixel 5,2 | Pixel 5,3 | Pixel 5,4 | Pixel 5,5 |

FIG. 6B

| Pixel 1,1 | Pixel 1,2 | Pixel 1,3 | Pixel 1,4 | Pixel 1,5 |
|---|---|---|---|---|
| Pixel 2,1 | Pixel 2,2 | Pixel 2,3 | Pixel 2,4 | Pixel 2,5 |
| Pixel 4,1 | Pixel 4,2 | Pixel 4,3 | Pixel 4,4 | Pixel 4,5 |
| Pixel 5,1 | Pixel 5,2 | Pixel 5,3 | Pixel 5,4 | Pixel 5,5 |

FIG. 6C

| Pixel 1,1 | Pixel 1,2 | Pixel 1,3 | Pixel 1,4 | Pixel 1,5 |
|---|---|---|---|---|
| Pixel 2,1 | Pixel 2,2 | Pixel 2,3 | Pixel 2,4 | Pixel 2,5 |
| Pixel 4,1 | Pixel 4,2 | Pixel 4,3 | Pixel 4,4 | Pixel 4,5 |
| Pixel 5,1 | Pixel 5,2 | Pixel 5,3 | Pixel 5,4 | Pixel 5,5 |

FIG. 6D

LIGHT SENSOR MODULE, FOCUSED LIGHT SENSOR ARRAY, AND AN AIR VEHICLE SO EQUIPPED

BACKGROUND

The present invention, in several embodiments, relates to light-sensing modules and, more particularly, to arrays of light-sensing modules adapted to have overlapping fields-of-view with each module having a focal plane array and processing structure to receive focused incident optical energy and output detection locations, each detection location being associated with a time tag or time-of-detection. An air vehicle equipped with at least one light-sensing module is also encompassed by the present invention.

Sensors of electromagnetic energy and signals are typically mounted to a support structure either for stability, conveyance or both. In applications where the electromagnetic signals of interest are of wavelengths best measured by two or more sensors, a distributed array of sensor elements, e.g., antenna elements, are typically employed. In applications where the electromagnetic signals to be received by the sensor are small in wavelength relative to the mounting structure for the sensor, then, rather than being distributed, the sensor is typically placed in an unobstructed and prominent location upon or within its support structure. In applications where the support structure geometry, or the economies of multi-sensor suites, precludes or otherwise forecloses particular surface areas or volumes for mounting specific electromagnetic sensors, these sensors are not readily suited for deployment in a distributed fashion about a portion or portions of the mounting structure having one or more prominences that obstruct what would otherwise be an unobstructed field-of-view (FOV). The effects of an obstructive mounting structure are exacerbated in those instances where the rotations and translations of the mounting structure, including those of the front end or guidance section of an air vehicle such as a missile or projectile, may obstruct the line-of-sight between the sensor and an external electromagnetic source. Such effects may be particularly enhanced where the external electromagnetic source is intermittent or pulsed, particularly where the pulses are short in duration and long in frequency relative to the rotation rate of the sensor about its obstruction.

SUMMARY OF THE INVENTION

The invention, in its several embodiments, includes a light-sensing module comprising a mounting support structure, e.g., an optical bench, and an optical element adapted to direct incident light to a detector array that may comprise an array of photodiodes, wherein the optical element is attached to the mounting support structure. The detector array is adapted to receive the directed light and convert the received light to a set of electrical pulses via a plurality of photodetectors, where each photodetector is operatively coupled to an amplifier and a threshold circuit. The threshold circuit may be adapted to output a detection signal to a first memory store, and the optical element may be aligned with the detector array via the mounting support structure. The first memory store is adapted to correlate or associate a detection signal with a time-of-arrival and a second memory store may be adapted, or the memory store may further be adapted, to correlate or associate a pixel location of the detector array from which a detection signal originates.

In some light-sensing module embodiments, the mounting support structure may be an optical bench. In some light-sensing module embodiments, the optical element may be an aspheric, complex mirror, or a lens. Embodiments of the invention include arrays comprised of a plurality of light-sensing modules mounted in or about a mounting structure that may include guidance section housings of an air vehicle such as a missile or projectile. The incident detections along with their associated times-of-arrival, as individual light-sensing module outputs, may be provided to a signal processor adapted to correlate or otherwise integrate the outputs of the plurality of light-sensing modules. The signal processor may be part of the guidance processing of an air vehicle such as a missile or projectile where information extracted from incident coherent light pulses reflected from one or more designated targets including their pixel location and associated time-of-arrival (TOA) or time-of-measurement (TOM) as represented by their time tag, for example, and their derived angles-of-arrival relative to the air vehicle may be output from the signal processing subsystem of a module to a guidance processing subsystem or module, all of which may be housed within a guidance section.

BRIEF DESCRIPTION OF THE DRAWINGS

For a more complete understanding of the present invention and for further features and advantages, reference is now made to the following description taken in conjunction with the accompanying drawings, in which:

FIGS. 6A, 6B, and 6C illustrate exemplary locations of a blurred incident light spot across four pixel locations;

FIG. 6D illustrates an exemplary registration of a blurred incident light spot across four pixel locations;

DETAILED DESCRIPTION

Figure 1:
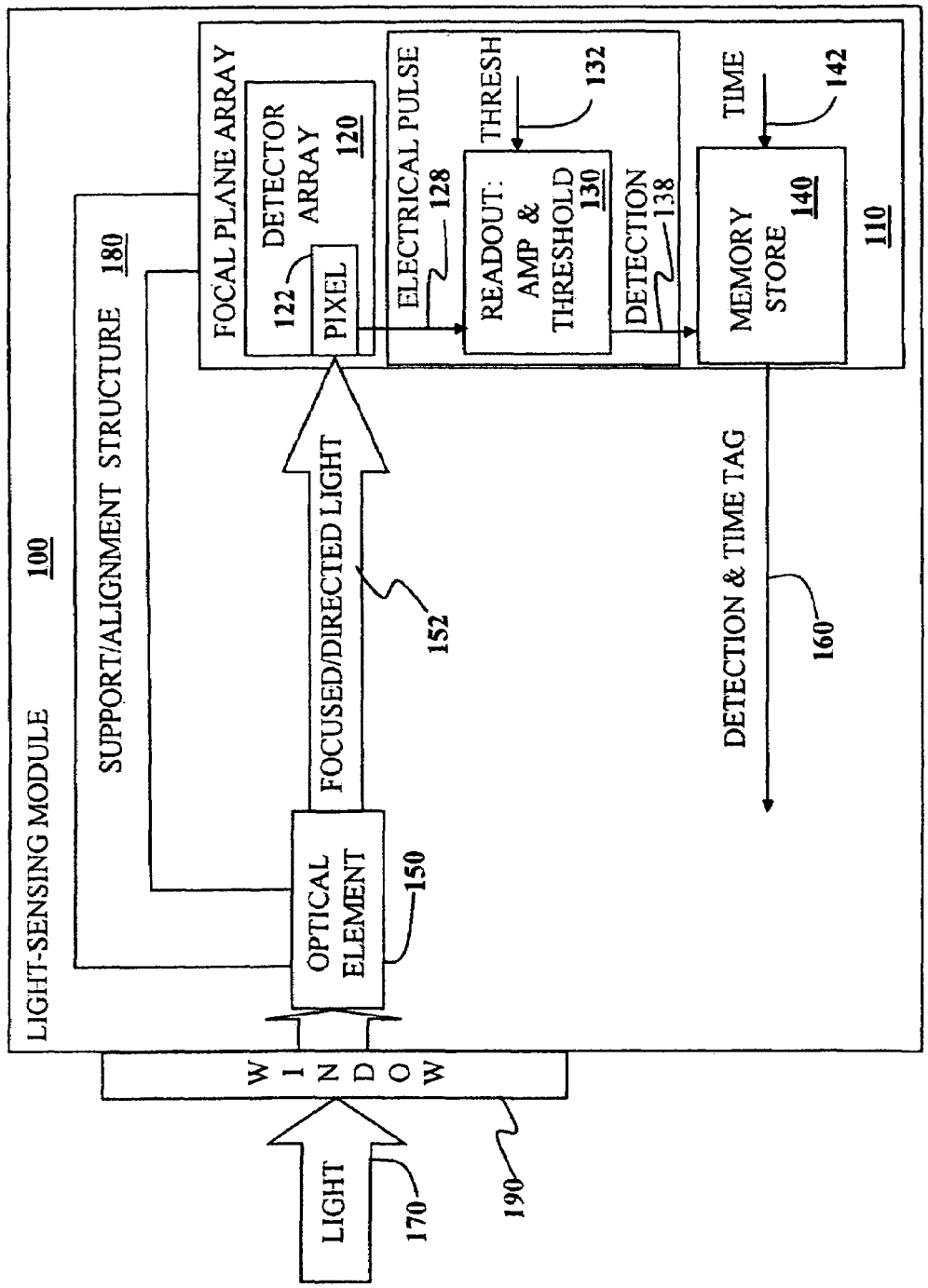
FIG. 1 is an exemplary functional block diagram of a light-sensing module embodiment of the present invention.

The several embodiments of the present invention, as illustrated in FIG. 1, include one or more light-sensing devices 100, each light-sensing device 100 having a focal plane array (FPA) 110 and where each light-sensing device 100 provides a time-tagged or time-associated detection output 160. The light-sensing device 100 further includes an optical element 150, such as a lens, a mirror, or both, to focus and/or direct incoming light 170 or an incoming light signal to one or more pixel-related regions 122 of the FPA 110. The FPA 110 may further include a detector array 120, a readout 130 which may include amplifying and thresholding circuitry, and a memory store 140. The threshold values 132 may be set external from the readout 130. The amplifying and thresholding circuitry 130 may also include multiplexing circuitry and may be part of a readout integrated circuit (ROIC). An exemplary response of the detector array 120 to an incident light pulse is a photoelectrical response causing the detector array to output an electrical pulse 128 from the incident pixel-related region 122. The electrical pulse 128 may be amplified and subjected to threshold tests as exemplary acts to determine whether the electrical pulse 128, and information that may be associated with the pulse, may be representative of a desired signal pulse and treated as a detected signal. The output of the threshold circuit may be a detection signal, which may be registered at the pixel level, and may be correlated or identified with the adjoining diode and may be stored, along with a temporal indication in a storage location, such a cell or word of a memory store. That is, the discerned information content of exemplary detection 138 detected at the exemplary signal detection stage may be placed in a memory store 140 along with a representation of time 142, such as a time stamp, a time tag, or a counter value, for example. Information pertaining to the exemplary detection 138 along with its time tag may be output by the FPA 110 via the memory store 140. The optical element 150 may be adjustably aligned with the FPA 110 via an alignment structure 180 such as an optical bench. The optical element 150 may be fixedly aligned with the FPA 110 via a support structure 180 within which, or about which, the FPA 110 and the optical element 150 may be mounted or otherwise fixedly attached or detachably attached. Embodiments of the present invention may include having the FPA 110, the optical element 150 and the alignment structure 180, if any, mounted or placed within or about a cavity or volume which may be formed within a structurally supportive material and may further include a window 190 interposed between the incoming light 170 and the optical element 150. The window 190 may have no optical power, and the incident rays 152 are typically in the far field or at an infinite focus. A cavity or space between the window 190 and the optical element 150 and a cavity or space between the optical element 150 and the FPA 110 may be comprised of air or may be of other media, such as media highly transmissive in the frequencies expected of the incoming electromagnetic signals.

Figure 2:
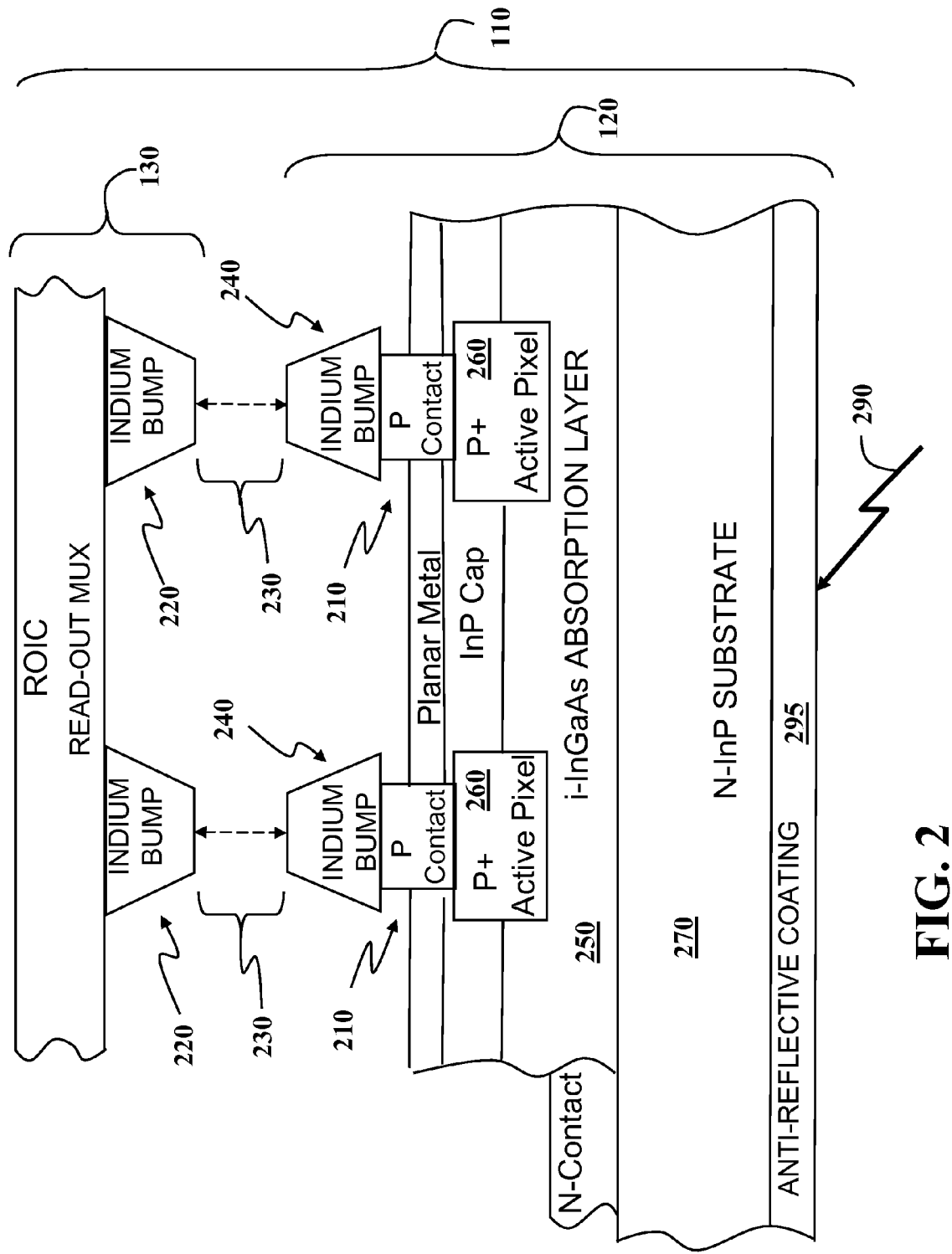
FIG. 2 illustrates in a cross-sectional view an exemplary interface of a portion of a photodiode array embodiment with a readout integrated circuit embodiment in stacked hybrid form.

In some embodiments of the present invention, a two-dimensional array of photodetector diodes, detector, or photodiode array (PDA) 120, and an ROIC 130 may be embodied as a stacked hybrid form of an FPA 110. Illustrated in FIG. 2 is a section or layer view of an exemplary FPA 110 in stacked hybrid form. The detector 120 may include an array of photodiodes 210 where a photodiode may be a semiconductor diode with an intrinsic region 250 sandwiched between P-doped 260 and N-doped 270 semiconducting regions, e.g., a positive-intrinsic-negative, or PIN, diode. The PDA may have an absorption layer made of a photoelectric material, such as Indium Gallium Arsenide (InGaAs) and Mercury Cadmium Telluride (HgCdTe). Other PDA detectors may be comprised of silicon detector arrays, for example. Photons absorbed in the intrinsic region 250 typically create electron-hole pairs that are then separated by an electric field, and generate an electrical current in the load circuit. The input 220 of the readout circuit or ROIC 130 of each photodiode 210 of each FPA 110 may adjoin, as shown at 230, or is otherwise contiguous to, the diode output 240. In some embodiments, the bumped portions of input 220 and output 240 may be of elemental gold. Accordingly, referring back to FIG. 1, each FPA 110 together with its optical element 150 operates as an independent sensor element or light-sensing module 100 that images a portion of angular space. The readout circuitry or ROIC 130, such as via or in cooperation with one or more memory stores 140, may communicate with other modules comprising the array or with one or more data processing devices via an electrical interconnect flex cable, for example. The FPA 110 may be applied to a mounting structure with an obstructive prominence, and with two or more focal plane arrays, as an array of FPAs, where each of the time-tagged detection outputs of the multiple FPAs may be integrated to maintain a continual line of sight between the array of FPAs and an external electromagnetic source or path.

Referring again to FIG. 2, the exemplary detectors or photodiodes 210 of the PDA 120 may be formed through a thin film deposition process onto a substrate 270, such as an Indium Phosphate substrate. An exemplary PDA 120 typically has its diodes arranged in columns and rows and accordingly a PDA 120 having its diodes arranged in 256 columns and 128 rows, i.e., a 256×128 PDA, also has approximately 32,000 diodes. The PDA 120 and ROIC 130 are typically aligned and bonded so each diode's active area 240 contacts an independent ROIC input 220.

The pixel separation distance, that is the distance between active areas, is termed the pitch of the PDA 120 and one exemplary pitch of the PDA 120 is 50 μm. Typically, the PDA 120 is back-illuminated so that the effective fill factor is 100%. Accordingly, each photon incident 290 on the N-doped material 270 may have a high probability of absorption. Electrons generated in the N-doped layer have sufficient lifetime, i.e., diffusion length, to assure that in the typical embodiments, each electron migrates to the depletion region of one of the PN junctions and may be thereafter collected as an output signal.

Detectors such as InGaAs photodiode detectors and silicon detectors may be compared based on relative spectral sensitivity, temporal responsiveness, and noise performance. In addition, the spectral response, i.e., the quantum efficiency (QE), of the detectors may be compared. The QE of InGaAs detectors typically remains above 80% in the electromagnetic wavelength range of from 0.9 μm to 1.7 μm, and the silicon diode spectral response typically extends to 1.1 μm in wavelength and has a QE of approximately 40% in the electromagnetic wavelength range of from 0.9 μm to 1.1 μm. The InGaAs response to longer wavelengths may be exploited in sensing electromagnetic energy having wavelengths above 1.4 μm, for example, the reflected light originating from human eye-safe designators emitting light, e.g., coherent light via lasing, at above 1.4 μm. In applications where the reflected light is pulsed and/or where the motions of the conveyance to which the sensor is mounted is moved relative to the inertial angle of the in-coming pulse, the duration of the incident pulse or beam on the detector array may be short relative to beams incident to statically mounted, staring detector arrays, i.e., to detector arrays having a static orientation relative to the incident light path. A designator, such as a laser designator, may have pulse widths that are so short in duration that they require sensors of high-frequency bandwidth for the designator's reflected signals to be sensed correctly. With regard to temporal responsiveness, InGaAs detectors are typically more responsive temporally than silicon diodes, due to the relatively larger terminal capacitance and lower shunt resistance of the silicon diodes. In addition, the short wavelength spectral response of an InGaAs detector may be tailored with, for example, an anti-reflective coating 295. That is, the InP substrate can be spectrally treated to absorb light below 1.04 μm, which reduces the motivation for complex spectral filtering. Where a filter may be needed, a short wavelength pass interference filter, for example, may suffice. The function of such an exemplary filter may be to prevent noise due to stray light above 1.1 μm; that is, the mostly low intensity natural sources that fall off rapidly beyond 1.1 μm.

Figure 3:
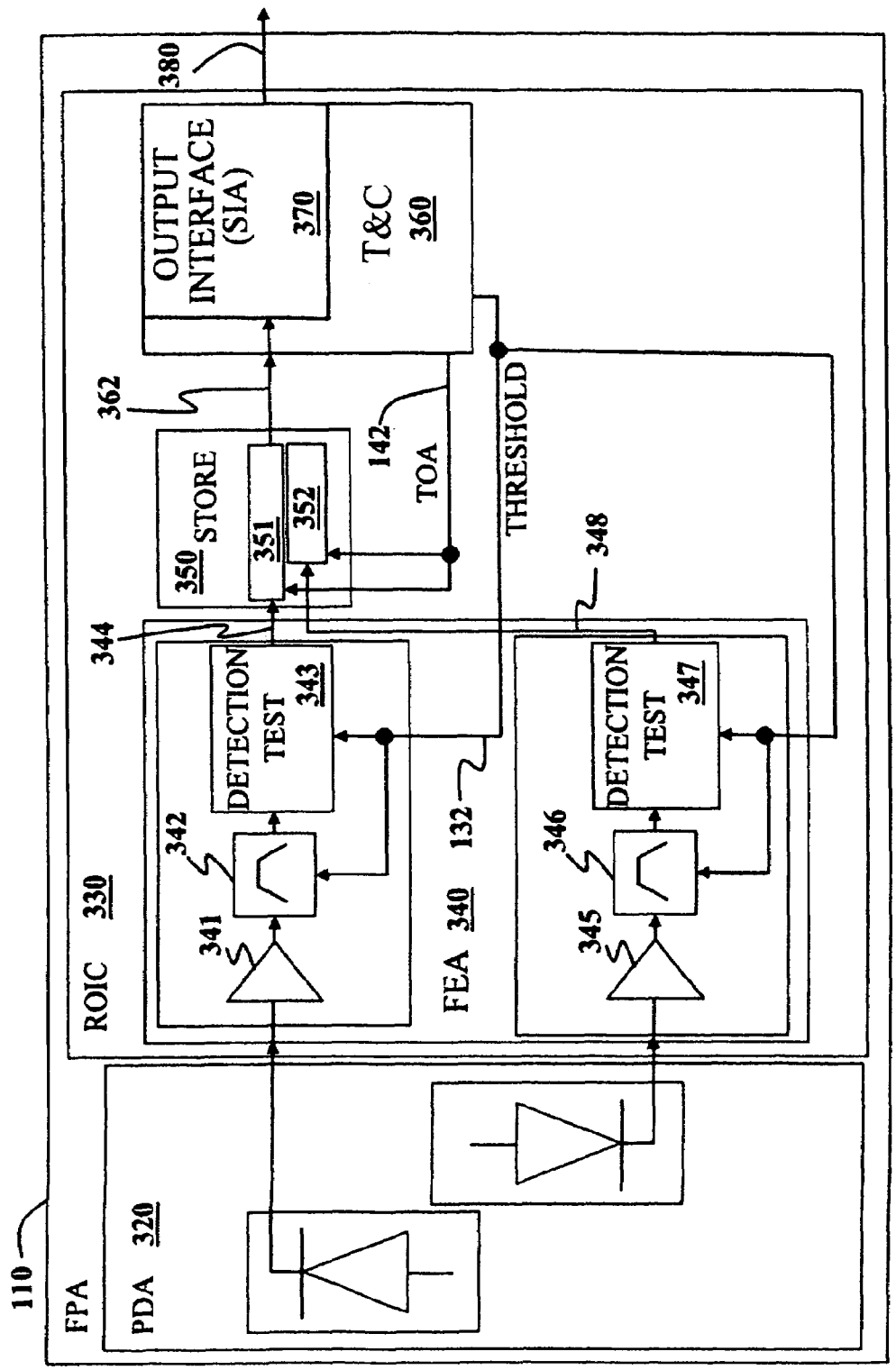
FIG. 3 is an exemplary functional block diagram of a focal plane array embodiment of the present invention.

FIG. 3 illustrates that where a photodiode array such as an exemplary 256×128 PDA 320 is hybridized to an ROIC 330, the ROIC 330 typically has four signal processing modules: e.g., the 256×128 detector front-end electronics (FEA) 340; the 256×128 memory module 350; the timing and control circuitry (T&C) 360; and the output interface 370 or external sensor interface assembly (SIA). Continuing with the 256×128 PDA example, the detector front-end electronics typically includes 256×128 trans-impedance amplifiers (TIAs) 341, 345 and threshold circuits 342, 346 that may include a detection test 343, 347. A function of the FEA module 340 may include limiting spurious signals and having a signal reference threshold value 132 typically set based on a threshold-setting signal source external to the FEA module 340, such as a T&C module 360, and may be applied for all detection events as determined by a detection test 343, 347. The detection for a particular pixel location 344, 348 may be then sent to a memory module 350 sized to store detection events and a representation of the time of detection. The exemplary T&C module 360, includes the effector of the state machine and as such, the T&C module 360 may track the various modes of operation, may update the system time, and may control the sequence of the various modes of the ROIC 330. In addition, the T&C module 360 may record the system time-of-arrival (TOA) or time-of-measurement (TOM) 142 for each event in a mapped memory module or memory store 350 that corresponds to the individual detector that sensed the incident energy. The 256×128 memory module 350 may be organized in 1×16 memory cells that may be accessed by the T&C module 360 and typically accessed twice in the processing of each detection. For example, the first time the T&C module 360 accesses the 256×128 memory module 350 may be to write the time 142 a detect event occurred, as a time-of-detection or time-of-arrival (TOA) 142, to a memory cell 352, of the memory module 350. The memory module 350 may store pixel location and the associated time-of arrival (TOA) or time-of-measurement (TOM) of the pixel having its portion of the FEA module 340 reporting the detection. The second time the T&C accesses the 256×128 memory module as part of the process cycle may be to read 362 from a memory cell 351 of the memory module 350 the time-of-arrival (TOA) 142 of a stored detection, and may read stored information identifying the pixel of the photodiode detector associated with the detection, as part of the output process. The output interface or sensor interface assembly 370 may include a second memory store (not shown) having one or more memory cells that may receive each paired detection signal and associated pixel location as detection test 343 via the T&C access, which may in turn be read as output 380. An additional function of the output interface or sensor interface assembly 370 is to support the signal interface to external circuits, e.g., off-FPA circuits. Accordingly, the output interface 370 may include line drivers and receivers for the various clocks, data, and command lines of the ROIC 330.

Exemplary Operational Modes

Some exemplary embodiments of the ROIC 330 may have three operational modes, e.g., the acquisition mode, the tracking mode, and the testing mode. Other embodiments of the ROIC may have one of these modes or two or more modes in combination. An exemplary acquisition mode set by the T&C module 360 may set a low threshold value 132 to accept all detections and pass detector or pixel location information and an associated time-of-arrival (TOA) or time-of-measurement (TOM) or a time tag to an output interface or SIA 370. An exemplary tracking mode may accept only those detection events that fall within a specified time window as may be set by the T&C module 360 and passes the time-of-arrival and location of the accepted detections to the SIA 370. An exemplary testing mode may be divided into several substates where the substates are adapted to facilitate, or allow for, evaluations of the various functions of the exemplary ROIC 330.

In some embodiments of the FPA 110 of the sensor module of the present invention, the ROIC 330 has two functional modes of operation, e.g., the acquisition mode and the track mode. In both modes, an optical pulse incident on the segmented mirror within a sensor element's FOV generates an electrical impulse signal. The FEA module 340 of the ROIC 330 may compare the impulse amplitude to a programmable amplitude value, i.e., the threshold or threshold value 132. If the impulse amplitude exceeds the threshold, the time-of-arrival 142 relative to an internal clock cycle count, or time tag, is saved in memory module 350 along with the pixel location 344 that received the optical pulse. Memory module 350 may be configured with a first-in-first-out (FIFO) data handling protocol. In addition, memory module 350 may be adapted to output the pixel location and time tag via the output interface 370, such as for further processing of such output by devices or subsystem elements such as direction finding processing modules or air vehicle guidance processing modules. For example, an external guidance processing device may read from the FIFO element and convert the pixel information from an air vehicle body coordinate frame into an inertial space and derive a vector to the designated and reflecting target. The FIFO time tag may be processed as a time-of-arrival value and accordingly may support fixing or placing of the pixel information in an inertial frame or a derivative inertial frame by, for example, tying pixel information, to inertial instruments that may be outputting time tagged air vehicle motions and the FIFO time tag may be processed to decode pulse-encoded information that may be in the reflected pulse stream. In acquisition mode, all signals above the threshold may be accepted by the ROIC 330 and communicated to the guidance system. Track mode typically limits the temporal window in which optical signals are received.

Imaging Optics

Figure 4:
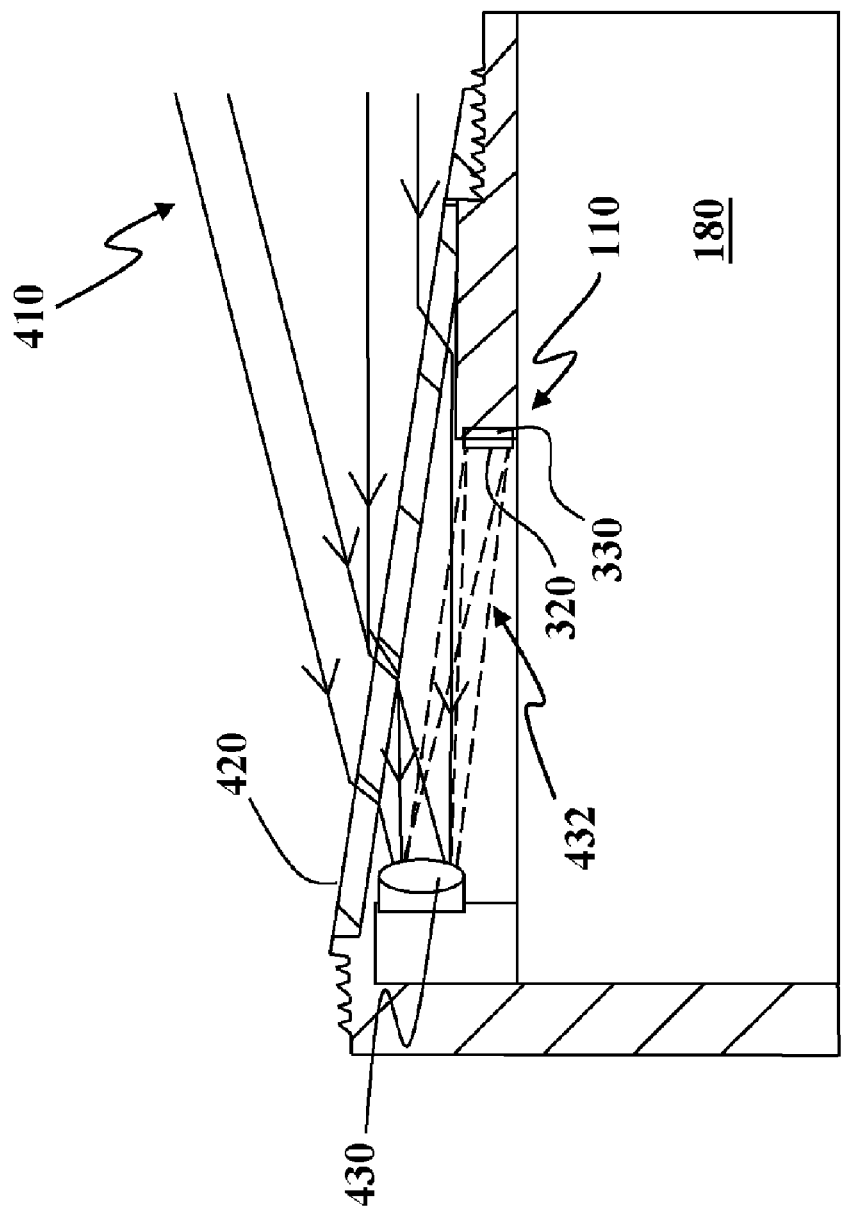
FIG. 4 illustrates in a cross-sectional view an exemplary light-sensing module having a reflective optical element.

Returning to FIG. 1, the optical element 150 may be either reflective or refractive. For those embodiments of the light-sensing module 100, where the imaging optics comprises a mirror, the mirror may be an aspheric, off-axis complex mirror. FIG. 4 illustrates exemplary ray traces 410 from two collimated sources through a window 420, reflecting off a mirror 430 and converging on to the photodetector array 320 typically hybridized to an ROIC 330. In some embodiments, combinations of reflective and refractive elements may be interposed between a window 420 and the FPA 110 of a light-sensing module. The PDA-to-mirror segment 432 can form an inverted, fragmented, off-axis image. One of ordinary skill in the art will recognize that, with regard to a single element imager, geometric optical parameters are typically interdependent.

Figure 5:
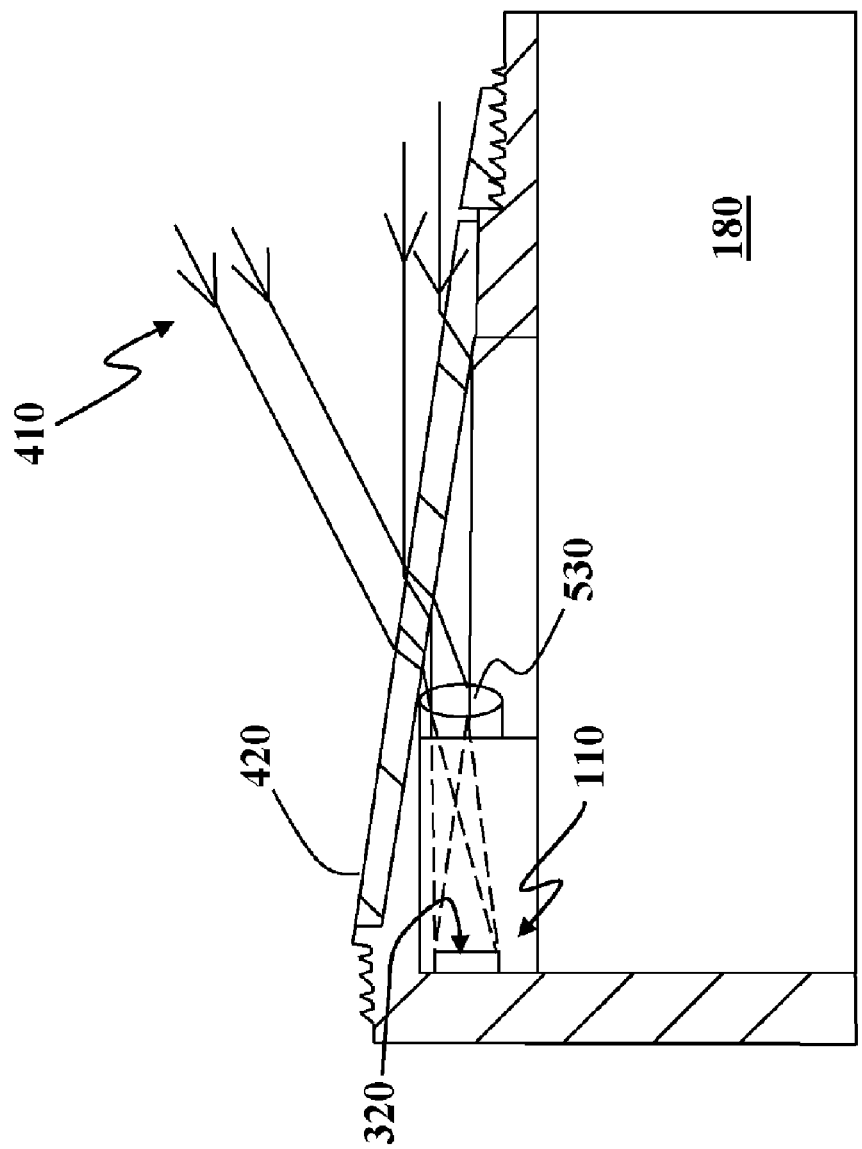
FIG. 5 illustrates in a cross-sectional view an exemplary light-sensing module having a refractive optical element.

Interdependent geometric optical parameters typically include: the effective focal length (EFL); the field-of-view (FOV); the image height; and the clear aperture (CA). Typically, the clear aperture and FOV are defined by system performance requirements. The image height is typically limited by space available and packaging constraints. The detector pitch and the optics FOV determine the angular resolution. A single detector has a field-of-view termed an Instantaneous Field of View (IFOV). If the mirror is nearly perfect, the angular resolution is the same as the detector IFOV. The image plane may be located at the mirror focal point, where it is typically described as being focused at infinity. In some embodiments, the optical element 430 is a complex mirror that may comprise a combination lens doublet and reflective surface. The doublet may include a fused silica aspheric Mangin lens and an aspheric zinc sulfide lens. Due to the reflective side of the Mangin lens, the incident light path passes through both lens elements twice before forming an image on the focal plane. Typically, the optical element is mounted to a support structure 180 or an optical bench via a cement bond. FIG. 5 illustrates exemplary ray traces 410 from two collimated sources through a window 420, being refracted by a lens 530 and on to the photodetector array 320 of the FPA 110. Additional embodiments of the image forming system of the optical element include complex-shaped mirrors and mirror-lens combinations, such as Cassegrain systems and Catadioptic systems.

Typically, the optical arrangement employed produces an incident light blur larger than a single pixel. FIGS. 6A, 6B and 6C illustrate the exemplary effects of an optical blur 610 on a region of the detector array. In each figure, the blur is shown within the region defined by pixel 2,2, pixel 2,3, pixel 4,2 and pixel 4,3. FIG. 6D illustrates the optical blur under filling four detectors. The actual position of the incident light may be represented by a point on the plane of the detector array and error in the actual position may be represented by a statistical standard deviation (1σ) of ±1/2 pixel where position centroiding may be used to reduce the error. The quantization root-mean-square (RMS) error may be expressed as $\pm 1\sigma/\sqrt{3}$ and may be achieved via pixel position centroiding, along with spatial oversampling. When projected into a three-dimensional reference frame that accounts for the optical orientation of, and optics and the light paths particular to, the light-sensor module, a detector pixel location may support, or otherwise provide a basis for, the derivation of a three-dimensional unit vector in an array fixed coordinate system, where the derived unit vector is directed to the source of the incident light.

Modular Array

Figure 7:
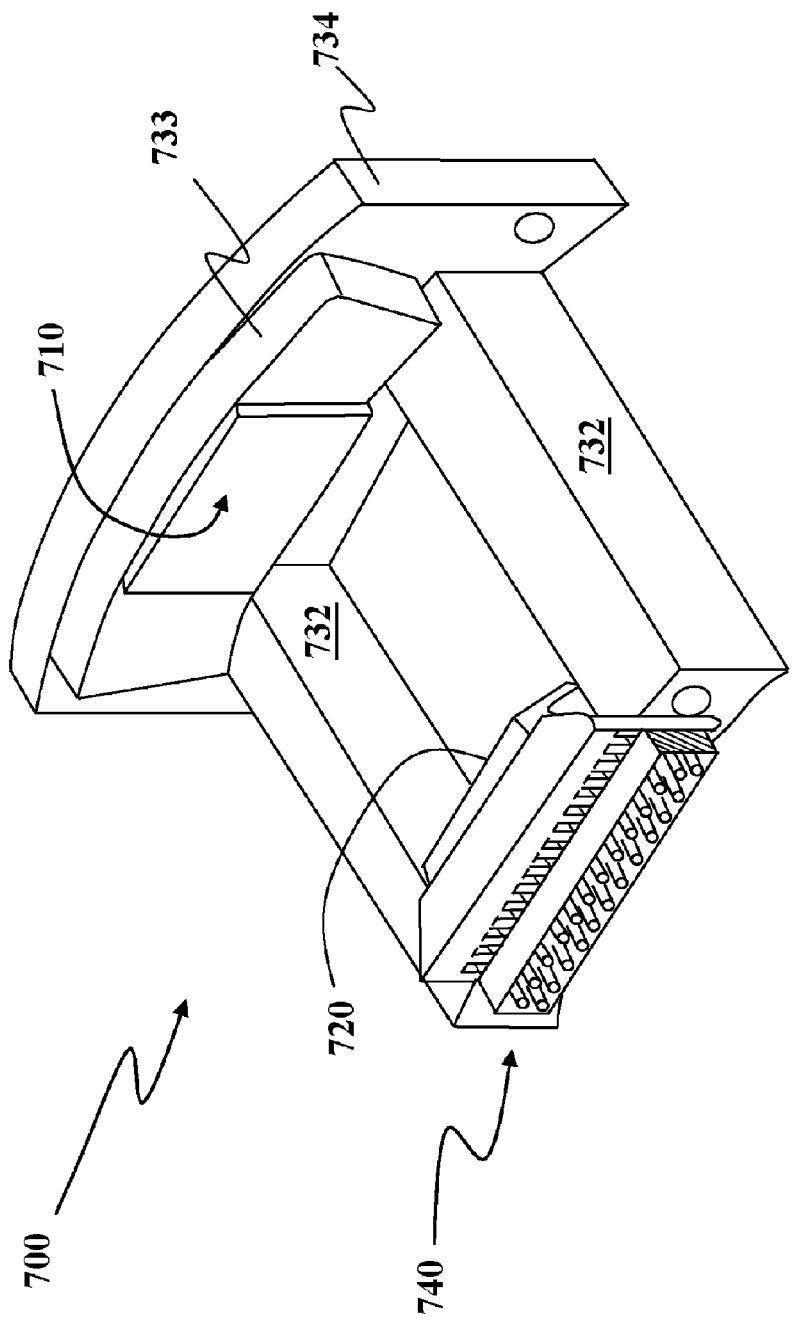
FIG. 7 illustrates in perspective view an exemplary light-sensing module of the present invention.

The light-sensing device 100 may be fabricated in discrete portions that may be mounted within a structure or the light-sensing device may be fabricated as a module. FIG. 7 illustrates a modular embodiment 700 of the light-sensing device 100, where the exemplary light-sensing module 700 includes a mirror 710 and FPA 720 aligned via structural members 732-734. In addition, the exemplary light-sensing module 700 may include an output interface 740 via flex cabling, for example, from the ROIC 330 of the FPA 720. The light-sensing module 700 may be deployed in an array of two or more light-sensing modules arrays 810, as illustrated by example in FIG. 8A, where two of four light-sensing modules 700 are shown in a perspective view being mounted to or otherwise having been placed within a mounting structure 800 itself having a center obstruction 820 where the module array 810 is shown concentric to the obstruction 820, in this example. The light-sensing modules 700 may be spaced equidistant from one another, and when the module array 810 is comprised of four light-sensing modules 700, the arrangement may be termed cruciform. An exemplary cruciform arrangement of the light-sensing module array 810 is illustrated in FIG. 8B as a cross-section view of FIG. 8A. Each light-sensing module 700 may be mounted or otherwise placed within a recess or cavity 830 of the mounting structure 800 bounded by edges of an aperture 850. Each recess or cavity 830 may be covered by a window or other medium substantially transparent or highly transmissive in the electromagnetic wavelengths for which the FPA 720 is responsive.

Window Assembly

Figure 9:
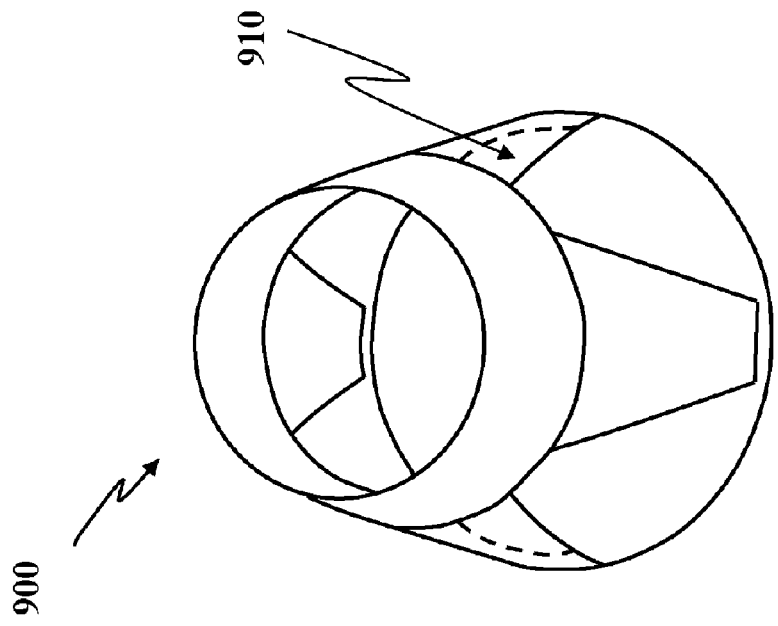
FIG. 9 illustrates in a perspective view an exemplary collar structure having four mounting portions for window coverings.

As illustrated in FIG. 9, each window may be mounted to a mechanical mount 910 which may be part of a mounting frame structure 900, such as collar structure. A mounting frame structure 900 may support the windows, where each mechanical mount 910 may provide the edges or portions of edges about an aperture to which an outer perimeter of a window element may be placed in contact. The window may be made of fused silica optical glass with a power of approximate unity. In addition, a polarization-insensitive coating may be applied to both the inside and outside window surfaces. In order to further protect the light-sensing module from undesired radio frequencies, such as electromagnetic interference (EMI), an EMI grid may be fixed to the surface of the window facing the light-sensing module 700. The illustrated mounting frame structure 900 is shown as frusto-conical to conform to aerodynamically low drag profiles. The function of the window assembly in munitions applications is typically to protect the sensor modules from the extreme launch and flight environment. In a cruciform sensor array munitions application, the sensor window assembly may include four fused silica transparent optical grade window segments each having magnifications of unity, i.e., no optical power. Embodiments of the light-sensing module adapted to receive lased light, each window glass may be treated with an EMI grid to prevent or reduce EMI radiated susceptibility while maintaining a high degree of laser transmission. In munitions embodiments, only the inside surface may be deposited with the EMI grid. The treated glass may include a special anti-reflective (AR) coating that reduces the effects from incident radiation having different polarization orientations. Both inside and outside window surfaces, that is sides facing toward and away from the light-sensing module, may be treated with a polarization insensitive AR coating.

Figure 8A:
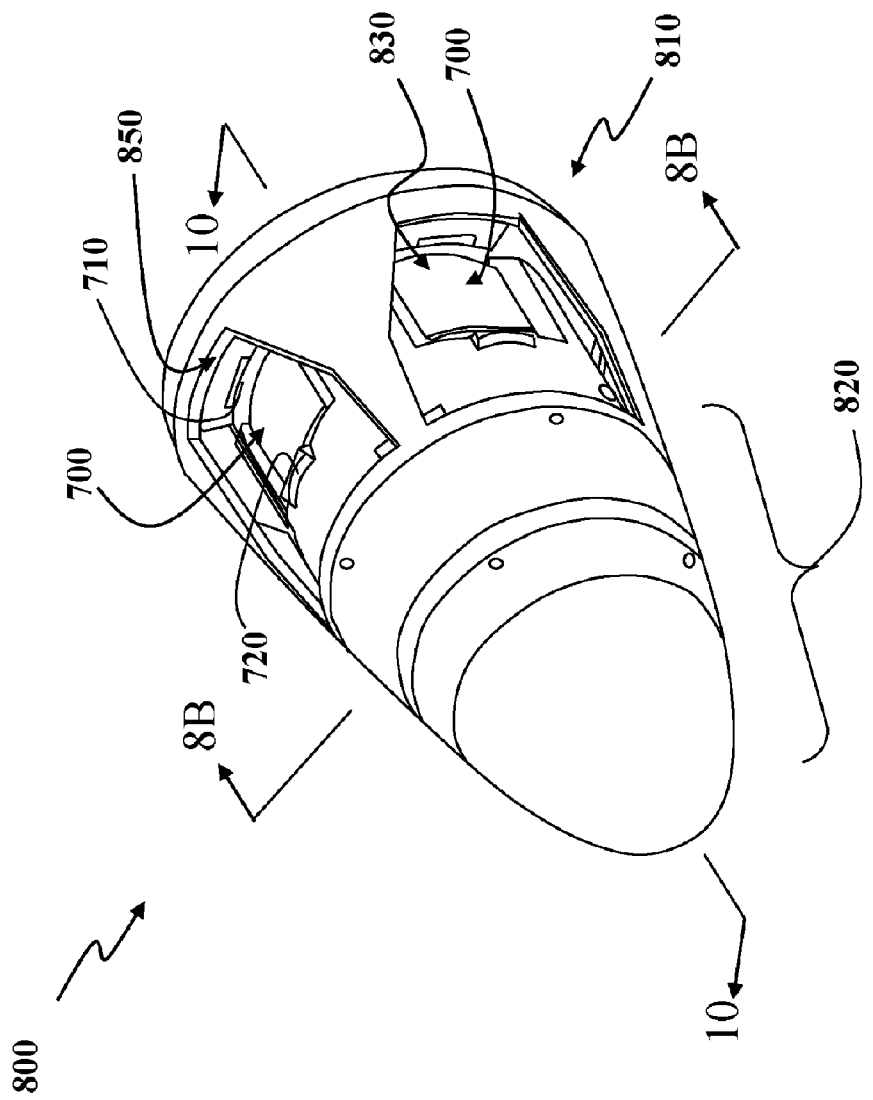
FIG. 8A illustrates in a perspective view two or more exemplary light-sensing modules placed in an exemplary mounting structure having a central obscuration.
Figure 8B:
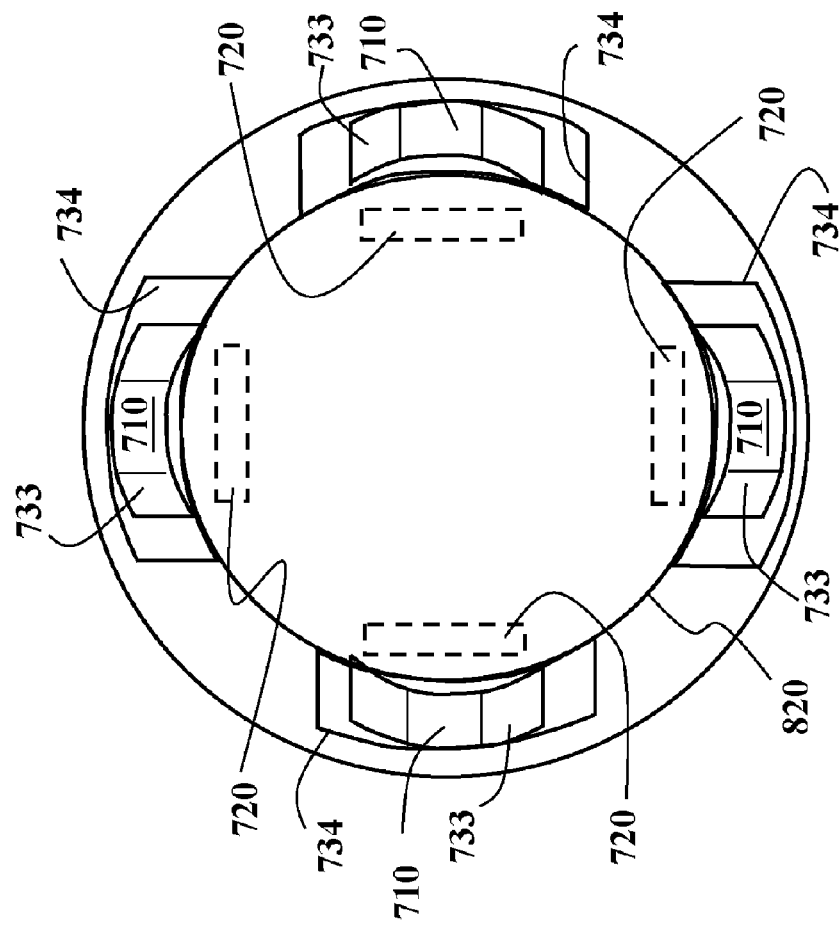
FIG. 8B illustrates in a cross-sectional view an array of four exemplary light-sensing modules.
Figure 10:
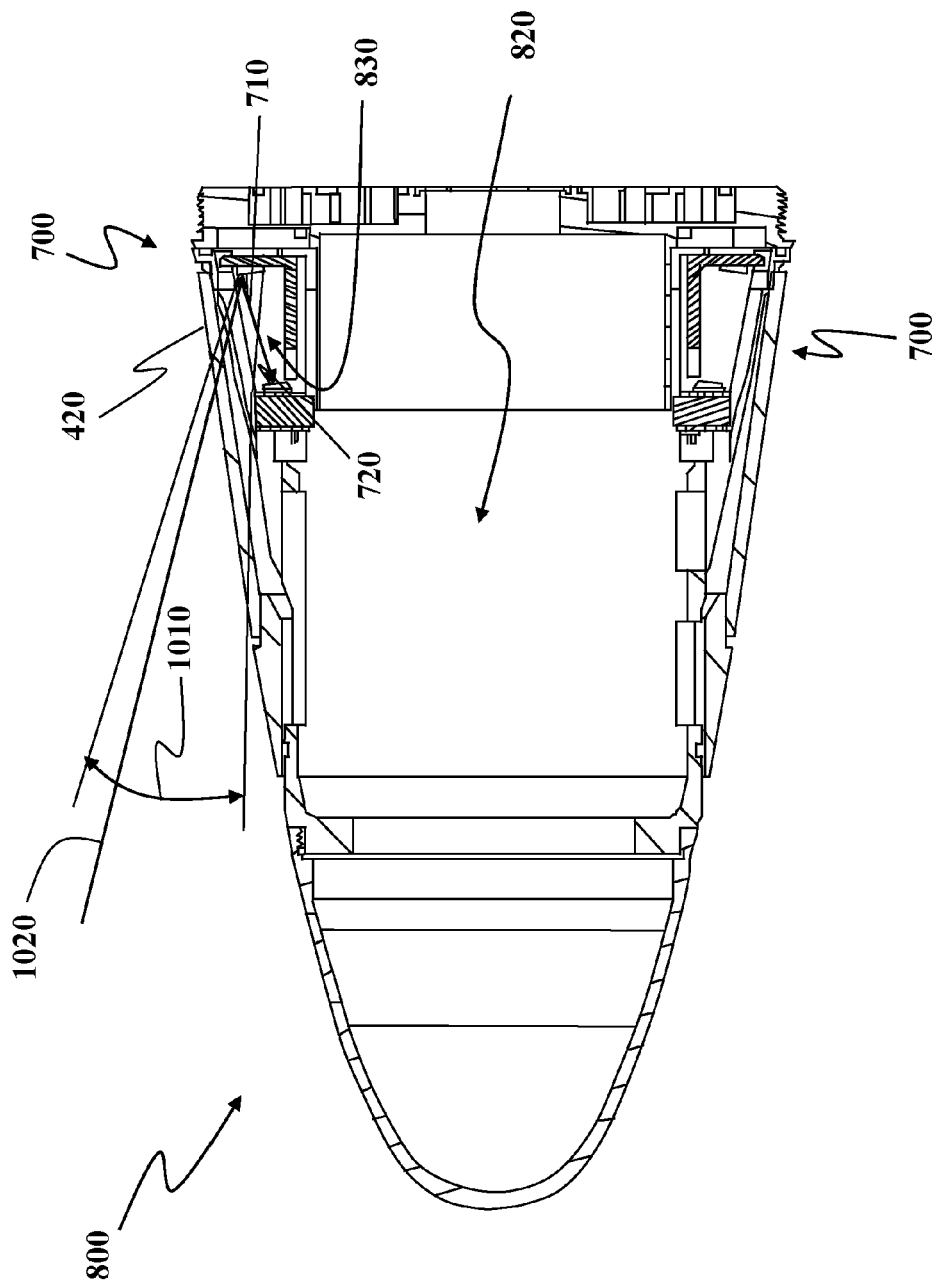
FIG. 10 illustrates in a cross-sectional view an exemplary planar field-of-view of the exemplary light-sensing module.
Figure 11:
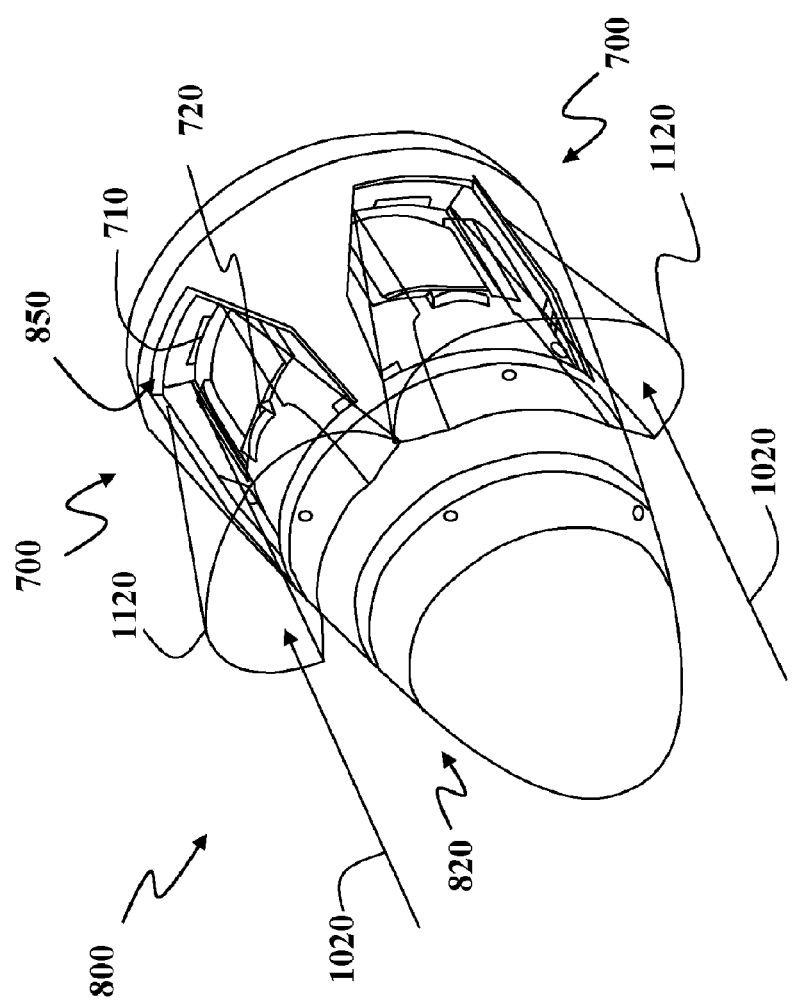
FIG. 11 illustrates in a perspective view a solid field-of-view of two exemplary light-sensing modules.

FIG. 10 illustrates an exemplary mounting structure 800 in a cross-sectional view of FIG. 8A where a top and a bottom light-sensing module 700 are also shown in cross-sectional view. The exemplary mounting structure 800 is shown having an aerodynamic shape. The light-sensing modules 700 are shown mounted within recesses 830 where a conformal window 420 is mounted to the mounting structure 800 or a mounting collar typically to both, to protect each light-sensing module 700 from environmental effects and to maintain a substantially aerodynamic shape, i.e., a shape supportive of a low drag coefficient. Accordingly, the optical energy 1020 that may be incident to each FPA 720 must first pass through the window 420 and be reflected by the imaging mirror 710 that is mounted in an off-axis orientation. For each sensor element of this mounting embodiment, the FOV 1010 may be limited by the extent of the center obscuring volume 820. FIG. 11 illustrates in perspective view the geometric line-of-sight angle limitations imposed by the mounting structure 800, the central obscuring volume 820, the edges of each aperture 850, the orientation and optical properties of the mirror 710, the orientation of the FPA 720 and resulting FOV volumes 1120 of each module 700.

Figure 12:
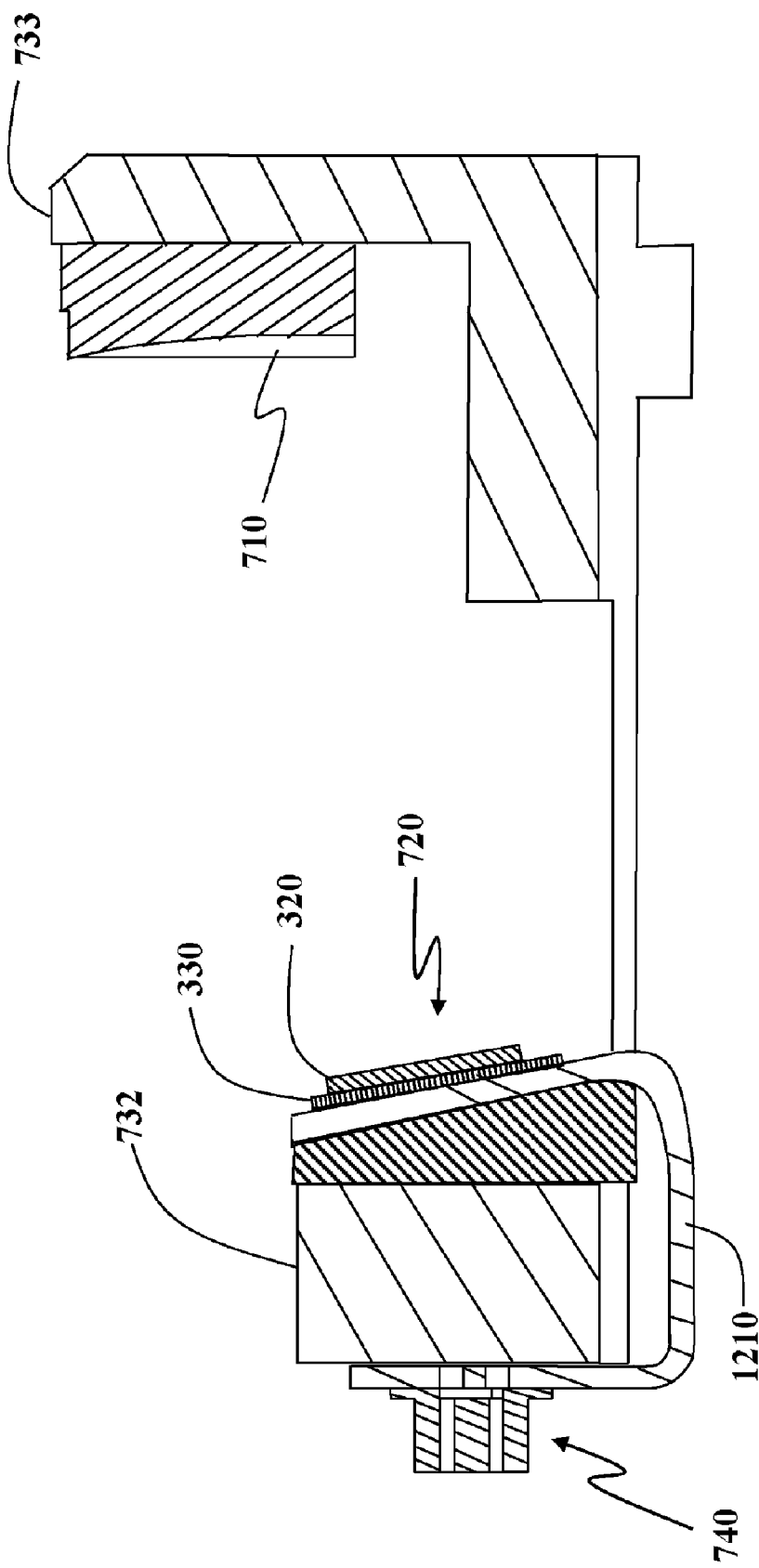
FIG. 12 illustrates in a cross-sectional view an exemplary embodiment of a light-sensing module.

FIG. 12 illustrates in cross-sectional view the imaging optics of each module mounted to a support structural member 733 that is operable, together with other support structural members 732, to support the alignment of the imaging optics 710 to an FPA 720 comprised of a PDA 320 and a hybridized ROIC 330. The input and output signals from the FPA 720 may be via cable, strip or bus 1210 to an interconnect flex cable 740 adapted to receive signals from external processing or other external inputs and to send pixel location signals from the memory module 350 (FIG. 3) together with time-of-measurement 142 for each incident light detection.

Figure 13:
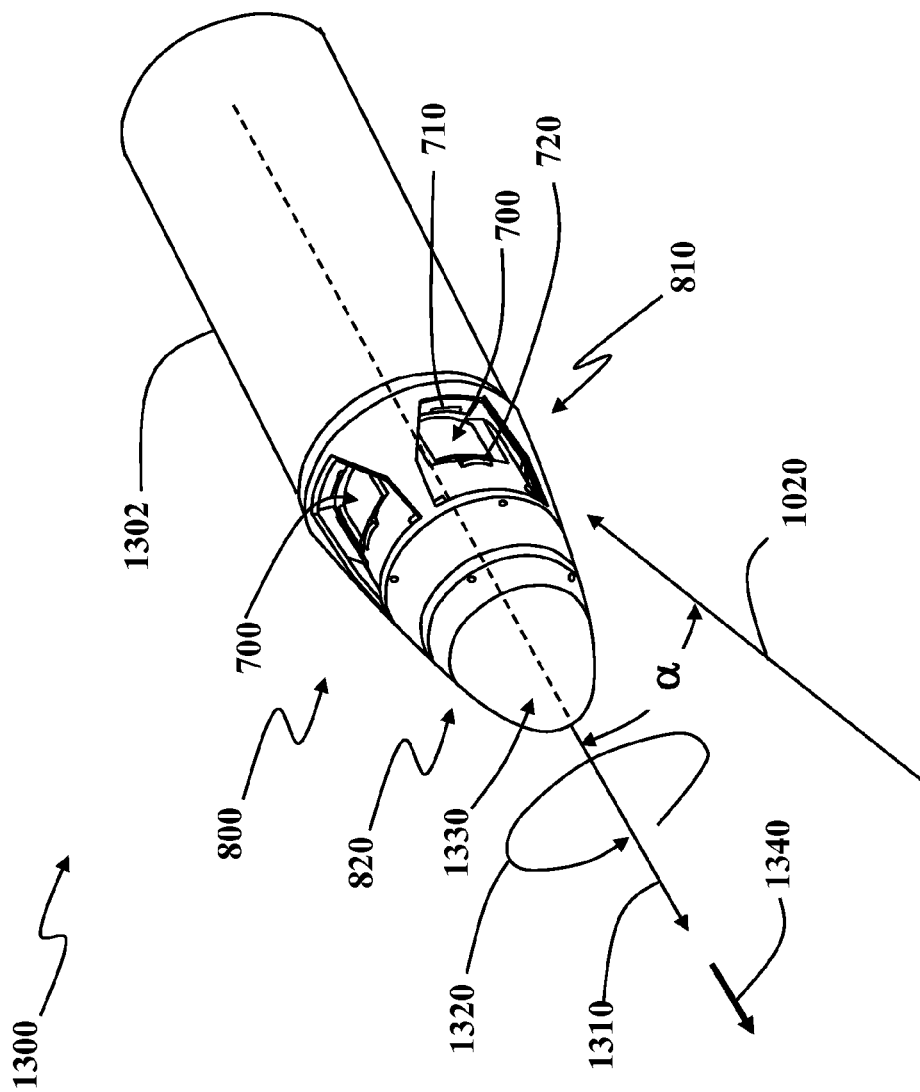
FIG. 13 illustrates in a perspective view exemplary light-sensing modules arranged in an array on a spinning body.

The mounting structure 800 together with the light-sensing module array 810 (FIG. 8A) may be integrated with an air vehicle 1300 such as missile or projectile as shown in FIG. 13. These embodiments may include the mounting structure 800 placed at the front end of an exemplary missile fuselage 1302, where in some instances the missile may rotate about a principal axis 1310, and in this example, may have a sustained roll rate 1320. In an exemplary use of an array 810 of sensor modules on a forward portion of a mounting structure 800 that is axisymmetric and spinning about that axis of symmetry 1310, four light-sensing modules 700 are equidistantly distributed in an annular array, or cruciform arrangement, that is in a plane perpendicular to the axis of symmetry 1310. The end surface of the forward portion of the mounting structure 1330, or a nose centerline of an air vehicle, may have various shapes that may include surfaces substantially conforming to solid geometric forms such as conical, hemispherical shapes and may include aerodynamic shapes, such as a von Karman or a tangent-ogive nose tip. All four light-sensing modules 700 are typically oriented in a forward-looking direction, i.e., a principal direction of travel of the air vehicle, so that there is some overlap in their respective fields-of-view. That is, where the mounting structure may have a direction of motion 1340, the mirrors 710 of each light sensing module 700 preferably face in that direction, i.e., forward, and reflect focused incident energy onto each respective FPA 720. The one or more detectors receive the incident optical energy 1020 and convert this energy into an electrical signal. One or more modules of the ROIC may then record the time-of-arrival (TOA) and may record the basis for angles-of-arrival derivations for the incident energy via the recording of one or more pixel locations that may be translated into missile or projectile body coordinates. In some embodiments, information such as laser pulse information content and angle-of-arrival may then be made available for the guidance system via the output interface 740 (FIG. 7). In this example, the overlap in the FOV between each light-sensing module 700 is about one degree, i.e., approximately 0.01748 radian. Where the mounting structure 800 is intended to have aerodynamically favorable characteristics such as low drag profiles, as in the example illustrated in FIG. 13, the light-sensing modules 700 may be mounted into cavities within the mounting structure 800 to the extent that each module, together with related fixtures, window elements 420, and/or treatments, remains conformal with the surface of the mounting structure 800 (FIG. 10).

Continuing with the exemplary use, an external electromagnetic signal source such as a laser designator may be directed to designate a target with a laser beam or laser pulses and a surface of the designated target may reflect the light from the laser designator to the array of sensor modules 810 where each sensor module has a detector array as part of its FPA 720. The reflected or refracted energy may be focused onto each detector array by a mirror lens, respectively. For those embodiments where longitudinal dimensions are at a premium, a focusing segmented mirror may be preferred. Unfocused energy embodiments are contemplated, however, focused energy embodiments are typically less susceptible to atmospheric turbulence and have higher sensitivity for detection purposes when compared with unfocused energy embodiments. The ROIC 330 provides a readout of the detector array or PDA 320 (FIG. 3) typically after compressing data to be communicated as spatial angular and temporal information for incident laser pulse or detection. In the exemplary array embodiment, each light-sensing module 700 forms an inverted fragmented imaging off-axis system with each light-sensing module 700 viewing a different region of the combined FOV. The inside radial edge of each sensor element images a portion of space directly in front of and along the air vehicle, missile or projectile body axis of symmetry or centerline 1310. The outer radial edge of the sensor elements defines the full sensor FOV. By combining the individual FOVs of the sensor elements, a complete FOV image in the direction of flight of the exemplary missile of FIG. 13 may be formed. When projected into a three-dimensional reference frame that accounts for the optical orientation of, and the optics and light paths particular to, each light-sensor module, each detector pixel location may be integrated to support, or otherwise provide a basis for, the derivation of a three-dimensional unit vector in an air vehicle body coordinate system, where the derived unit vector is directed to the source of the incident light, and which, in reflected designator examples, could be a target to which the air vehicle may be directed. Such unit vectors may be expressed as a pair of angles-of-arrival. In those instances where the angle-of-arrival, $\alpha$, of the incident optical energy 1020 is off the centerline, that is, non-zero, the front obscuring portion 820 of the mounting structure 800 may periodically rotate into the line-of-sight that may be established along the path of the incident optical energy 1020. Accordingly, two or more light-sensing modules 700 may be placed in an array 810 with overlapping FOVs so that the incident optical energy 1020 may be received by at least one light-sensing module 700 at all times or for the durations of its transmissions. In addition, the angle accuracy of the reported position, typically in missile body coordinates, improves via spatial oversampling with the increase in the number of light-sensing modules redundantly receiving the incident energy pulse. Two and three light-sensing module 700 embodiments occupy less volume and are typically more economical than embodiments having four or more light-sensing modules, but this approach may be at the expense of reduced oversampling of angular position measurements due to the reduced overlap of angular coverage of the FOV. In addition, with an increase in the number sensor elements distributed in the exemplary annular array, the greater the oversampling, which, with post-detection processing described above, may improve angular position measurements and estimation accuracy.

Figure 14:
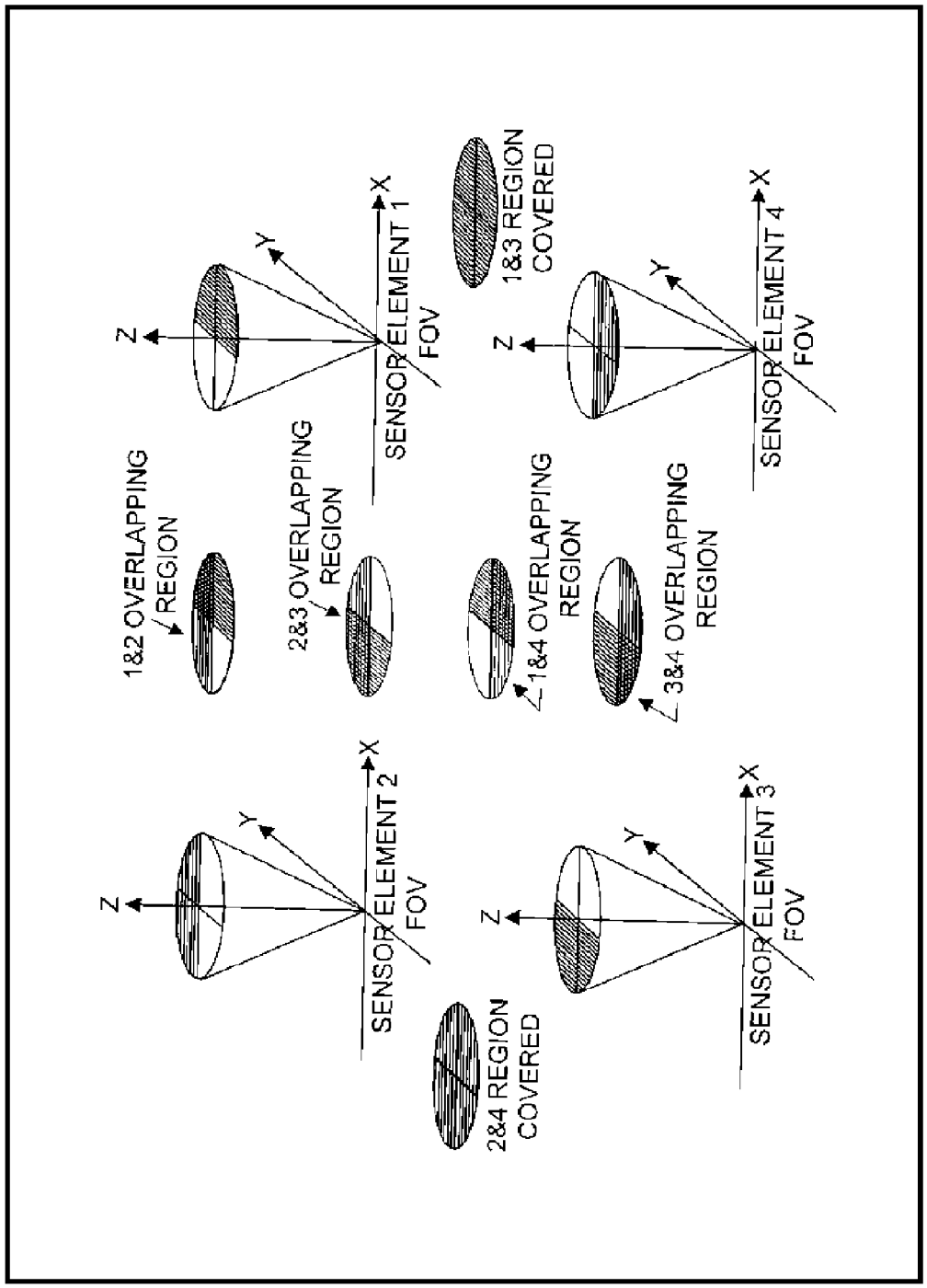
FIG. 14 illustrates notionally an overlapping of module fields-of-view for an exemplary four-module array having exemplary light-sensing modules distributed equidistantly and annularly about the front end of a rotating body.

In the four light-sensing module 700 of array 810 illustrated in FIG. 13, at least a two-module redundancy is obtained. Oversampling or overlapping of module FOVs for increased angle accuracy and to maintain sensing continuity with the incident optical energy may be illustrated notionally in FIG. 14 for a four-module array having sensor elements distributed equidistantly and annularly about the front end of the exemplary missile of FIG. 13. Each module is shown as a sensor element, i.e., sensor elements numbered consecutively about a mounting structure as sensor elements 1, 2, 3 and 4, and each have one-half of the combined FOV. The notional illustration of FIG. 14 shows that at least two sensor elements on opposite sides of a mounting structure are required for a combined total FOV region of coverage as represented by the area of a cut perpendicular to the axis of symmetry of the solid cone angle of a combined total FOV and where incident optical energy is received by adjacent sensor elements, and overlap and an opportunity for oversampling is presented.

With regard to image resolution, the total number of detectors of the PDA 320 (FIG. 3) may determine the angular resolution. For example, a camera that contains 256×256 pixels located on the missile centerline with comparable optics, has the same angular resolution and FOV as an exemplary embodiment of the invention with the same number of detectors distributed equally in each PDA 320 of each light-sensing module 700. That is, for a four-sensor element arrangement each sensor element would contain a 128×128 detector array 320 and collectively be comparable to the camera having 256×256 pixels. Where oversampling and reception continuity are sought, exemplary PDAs having 256×128 pixels may be used in the distributed array of four sensor modules for nearly 100% oversampling of a portion of the total FOV by each module 700.

Figure 15:
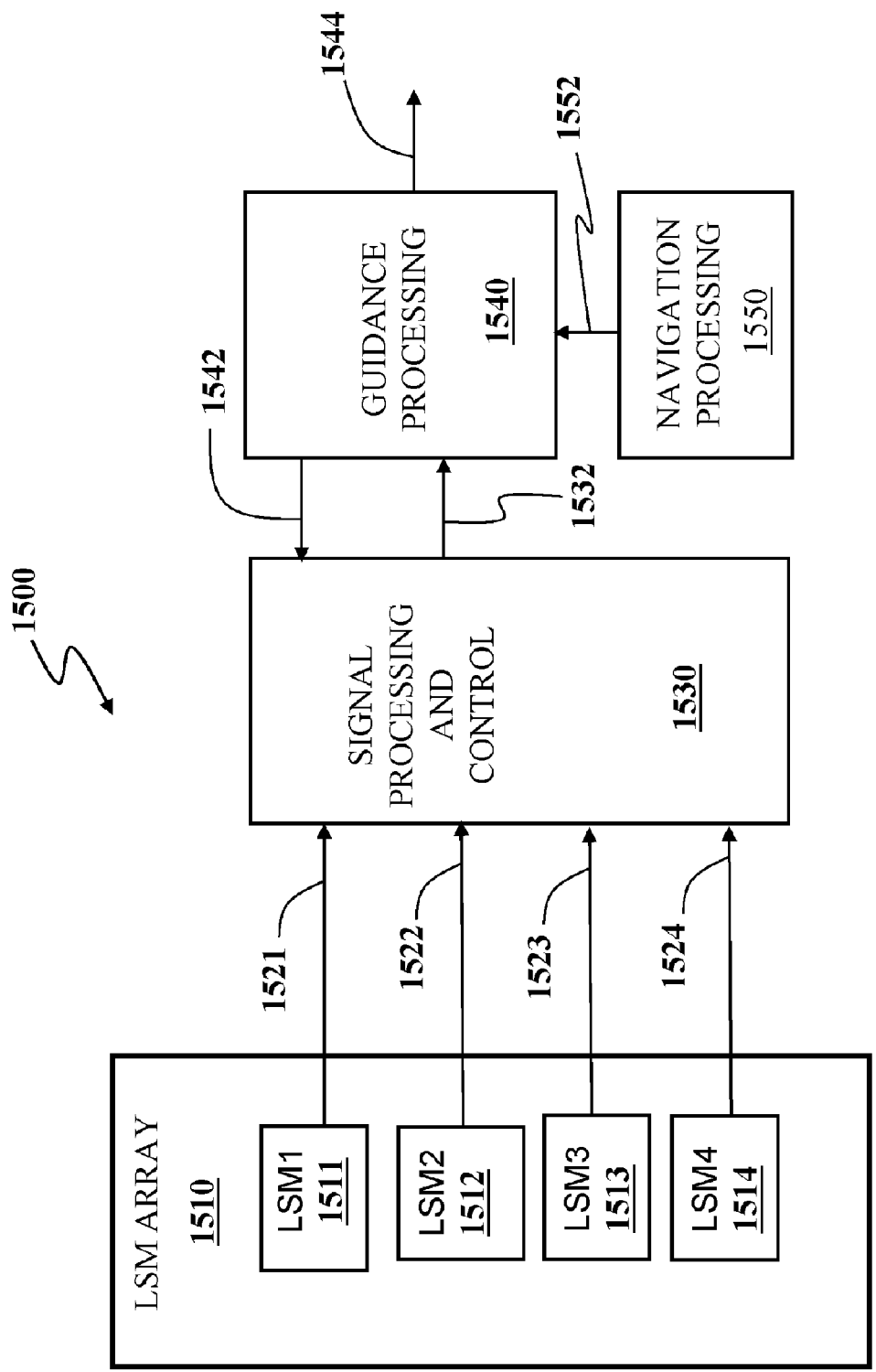
FIG. 15 illustrates in a functional block diagram guidance section signal processing having outputs of four exemplary modules processed in support of air vehicle guidance.

The air vehicle 1300 may have mounting structure 800 (FIG. 13) adapted to both structural support of the light-sensing modules and additional signal processing that may be used to guide the air vehicle. The portion of the air vehicle 1300 having such adaptation is typically placed along the forward portion of the air vehicle 1300 and called a guidance section. FIG. 15 illustrates in functional block diagram form an exemplary guidance section 1500 where each light-sensing module (LSM), that is LSM1 1511, LSM2 1512, LSM3 1513 and LSM4 1514 of the LSM array 1510, outputting row and column PDA information associated with the detected incident optical energy along with a time-of-measurement (TOM) or time-of-arrival (TOA) via each respective signal path of each LSM 1521, 1522, 1523, 1524 to a signal processing and control module 1530. The row and column information may be translated within the signal processing and control module 1530 and output in a missile body coordinate frame. The signal processing and control module 1530 may correlate the two or more received signals from the light-sensing modules where the signal may have pixel and TOA, TOM or time-tagged information with which to compare and determine one or more light source directions, typically expressed as angles-of-arrival that are relative to the array of LSMs 1510. Clock and synchronization signals 1542 may be provided by the guidance processing module 1540 to the signal processing and control module 1530. Detected incident optical energy may be translated into angles-of-arrival by the signal processing and control module 1530 and output 1532 to the guidance processing module 1540. A navigation processing module 1550 may reference inertial measurement sensor and/or a Global Positioning Satellite receiver and/or an external navigation beacon and therefrom output 1552 the missile angular and linear position vector and angular and linear velocity vector in one or more frames that may include an inertial space. The navigation processing module output 1552 may be combined in the guidance processing module 1540 with the signal processing and control module output 1532 to yield missile guidance commands 1544. The missile guidance commands 1544 may effect one or more various trajectory-altering actuators, motors or propulsive devices known to those of ordinary skill in the art.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims.

The definitions of the words or elements of the following claims are, therefore, defined in this specification to include not only the combination of elements which are literally set forth, but all equivalent structure, material or acts for performing substantially the same function in substantially the same way to obtain substantially the same result. In addition to the equivalents of the claimed elements, obvious substitutions now or later known to one with ordinary skill in the art are defined to be within the scope of the defined elements.

What is claimed is:

1. An array comprising a plurality of light-sensing modules, each light-sensinglight-sensing module spaced apart from one another, wherein each light-sensinglight-sensing module has a field-of-view overlapping a portion of a field-of-view of at least one other light-sensing module of the plurality of light-sensing modules and wherein each light-sensing module comprises:
   an optical element adapted to direct incident light to a detector array;
   wherein the detector array is adapted to receive directed incident light and convert received light to a set of electrical pulses via a plurality of photodetectors, each photodetector operatively coupled to an amplifier and a threshold circuit, wherein each threshold circuit is adapted to output a detection signal to a first memory cell of a first memory store;
   wherein the first memory store is adapted to associate the detection signal with a time tag; and
   wherein the array further comprises a processing module adapted to correlate a first stored detection signal and an associated first time tag from a first light-sensing module of the plurality of light-sensing modules with a second stored detection signal and an associated second time tag from a second light-sensing module of the plurality of light-sensing modules.

2. The array of claim 1, wherein each photodetector is associated with a pixel location, each detection output signal is associated with a pixel location and the first memory store is further adapted to associate each detection signal with the associated pixel location.

3. The array of claim 1, wherein each photodetector is associated with a pixel location, each detection output signal is associated with a pixel location and the array further comprises a second memory store adapted to associate each detection signal with the associated pixel location.

4. The array of claim 1, wherein the optical element of at least one of the plurality of light-sensing modules is aligned with the detector array of the at least one of the plurality of light-sensing modules via an optical bench element.

5. The array of claim 1, wherein the optical element of at least one of the plurality of light-sensing modules is an aspheric, off-axis mirror.

6. The array of claim 1, wherein the plurality of light-sensing modules comprising the array are disposed in an annular array.

7. The array of claim 6, wherein the annular array comprising the plurality of light-sensing modules is a rotating annular array of light-sensing modules, wherein each light-sensing module is adapted to receive and output one or more detections of pulsed coherent light.

8. The air vehicle of claim 1, wherein the plurality of light-sensing modules of the array are disposed about an outer portion of a mounting structure.

9. An air vehicle comprising:
a fuselage and a guidance section comprising:
an array comprising a plurality of light-sensing modules, each light-sensing module spaced apart from one another, wherein each light-sensing module has a field-of-view overlapping a portion of a field-of-view of at least one other light-sensing module of the plurality of light-sensing modules and wherein each light-sensing module comprises:
an optical element adapted to direct incident light to a detector array;
wherein the detector array is adapted to receive directed incident light and convert received light to a set of electrical pulses via a plurality of photodetectors, each photodetector operatively coupled to an amplifier and a threshold circuit, wherein each threshold circuit is adapted to output a detection signal to a first memory cell of a first memory store;
wherein the first memory store is adapted to associate the detection signal with a time tag; and
wherein the array further comprises a processing module adapted to correlate a first stored detection signal and an associated first time tag from a first light-sensing module of the plurality of light-sensing modules with a second stored detection signal and an associated second time tag from a second light-sensing module of the plurality of light-sensing modules.

10. The air vehicle of claim 9, wherein each photodetector is associated with a pixel location, each detection output signal is associated with a pixel location and the first memory store is further adapted to associate each detection signal with the associated pixel location.

11. The air vehicle of claim 9, wherein each photodetector is associated with a pixel location, each detection output signal is associated with a pixel location and the array further comprises a second memory store adapted to associate each detection signal with the associated pixel location.

12. The air vehicle of claim 9, wherein the optical element of at least one of the plurality of light-sensing modules is aligned with the detector array of the at least one of the plurality of light-sensing modules via an optical bench element.

13. The air vehicle of claim 9, wherein the optical element is an aspheric, off-axis mirror.

14. The air vehicle of claim 9, wherein the plurality of light-sensing modules comprising the array are disposed in an annular array.

15. The air vehicle of claim 14, wherein the annular array comprising the plurality of light-sensing modules is a rotating annular array of light-sensing modules, wherein each light-sensing module is adapted to receive and output one or more detections of pulsed coherent light.

16. The air vehicle of claim 9, wherein the guidance section further comprises a signal processing module adapted to receive, from at least one of the plurality of light-sensing modules, one or more detections, each detection having a pixel location with an associated time tag and further adapted to correlate the pixel location and the time tag of each of the one or more detections.

17. The air vehicle of claim 9, wherein the plurality of light-sensing modules of the array are circumferentially disposed about the fuselage of the air vehicle.

18. A method of integrating a plurality of detections of a plurality of light pulses by a plurality of light-sensing modules, each light-sensing module spaced apart from one another, wherein each light-sensing module has a field-of-view overlapping a portion of a field-of-view of at least one other light-sensing module of the plurality of light-sensing modules and wherein each light-sensing module comprises an optical element, a photodetector array, and a front-end processing module, the method comprising the acts of:
for at least one of the plurality of light-sensing modules:
focusing at least one of a plurality of light pulses by an optical element onto a photodetector array to generate one or more detection signals, each detection signal from one or more photodetectors of the array;
amplifying and thresholding the generated one or more detection signals;
for each of the one or more detection signals: storing each detection signal, with a time tag associated with a time-of-measurement of the detection signal, in a store location, wherein the store location is associated with the photo-detector array from which the detection signal was generated; and
extracting at least one of the stored detection signals from each of at least two of the plurality of light-sensing modules; and correlating each of the extracted detection signals from the at least two of the plurality of light-sensing modules according to the store location and the time tag.

* * * * *

UNITED STATES PATENT AND TRADEMARK OFFICE
CERTIFICATE OF CORRECTION

| | | |
|---|---|---|
| PATENT NO. | : 7,397,019 B1 | Page 1 of 1 |
| APPLICATION NO. | : 11/163446 | |
| DATED | : July 8, 2008 | |
| INVENTOR(S) | : James E. Byars et al. | |

It is certified that error appears in the above-identified patent and that said Letters Patent is hereby corrected as shown below:

On the title page:
In ITEM *Primary Examiner*:   change "Georgia Epps" to --Stephen Yam--
In ITEM *Assistant Examiner*:   delete "Assistant Examiner–Brian J Livedalen"

In the specification:

| | | |
|---|---|---|
| COLUMN 2, | LINE 43, | change "in" to --in a-- |
| COLUMN 4, | LINE 67, | change "in-coming" to --incoming-- |
| COLUMN 5, | LINE 39, | change "time of detection." to --time-of-detection.-- |
| COLUMN 9, | LINE 46, | change "light sensing" to --light-sensing-- |
| COLUMN 10, | LINE 8, | change "lens," to --or lens,-- |

In the claims:

| | | | |
|---|---|---|---|
| CLAIM 1, | COLUMN 12, | LINE 21, | change "light-sensinglight-sensing" to --light-sensing-- |
| CLAIM 1, | COLUMN 12, | LINE 22, | change "light-sensinglight-sensing" to --light-sensing-- |
| CLAIM 18, | COLUMN 14, | LINE 41, | change "photo-detector" to --photodetector-- |

Signed and Sealed this
Fourteenth Day of May, 2013

Teresa Stanek Rea
*Acting Director of the United States Patent and Trademark Office*